US008334703B2

(12) United States Patent
Mostov (10) Patent No.: US 8,334,703 B2
(45) Date of Patent: Dec. 18, 2012

(54) APPARATUS FOR REMOTE DETECTION AND MONITORING OF CONCEALED OBJECTS

(75) Inventor: Kirill Mostov, Berkeley, CA (US)

(73) Assignee: Roiksimt, St. Petersburg (RU)

( * ) Notice: Subject to any disclaimer, the term of this patent is extended or adjusted under 35 U.S.C. 154(b) by 971 days.

(21) Appl. No.: 12/275,063

(22) Filed: Nov. 20, 2008

(65) Prior Publication Data

US 2012/0229322 A1 Sep. 13, 2012

Related U.S. Application Data (60) Provisional application No. 60/989,399, filed on Nov. 20, 2007.

(51) Int. Cl.
G01R 27/04 (2006.01)
G01R 27/32 (2006.01)

(52) U.S. Cl. ........................................ 324/642; 324/637

(58) Field of Classification Search .................. 324/637, 324/642
See application file for complete search history.

(56) References Cited

U.S. PATENT DOCUMENTS

| 4,792,796 | A | 12/1988 | Bradshaw et al. |
|---|---|---|---|
| 4,821,291 | A | 4/1989 | Stevens et al. |
| 4,879,756 | A | 11/1989 | Stevens et al. |
| 4,926,868 | A | 5/1990 | Larsen |
| 4,937,586 | A | 6/1990 | Stevens et al. |
| 5,177,432 | A | 1/1993 | Waterhouse et al. |
| 5,245,534 | A | 9/1993 | Waterhouse et al. |
| 5,374,815 | A | 12/1994 | Waterhouse et al. |
| 5,406,842 | A | 4/1995 | Locke |
| 5,446,461 | A * | 8/1995 | Frazier ........................... 342/22 |
| 5,457,394 | A * | 10/1995 | McEwan ...................... 324/642 |
| 5,472,309 | A | 12/1995 | Bernard et al. |
| 5,507,291 | A | 4/1996 | Stirbl et al. |
| 5,532,465 | A | 7/1996 | Waterhouse et al. |
| 5,533,606 | A | 7/1996 | Yuyama |
| 5,646,616 | A | 7/1997 | Komatsu |
| 5,670,886 | A | 9/1997 | Wolff et al. |
| 5,875,434 | A | 2/1999 | Matsuoka et al. |
| 5,877,962 | A | 3/1999 | Redcliffe |
| 5,905,380 | A | 5/1999 | Weiner et al. |
| 5,943,841 | A | 8/1999 | Wunscher |
| 6,032,127 | A | 2/2000 | Schkolnick et al. |
| 6,208,908 | B1 | 3/2001 | Boyd et al. |

(Continued)

OTHER PUBLICATIONS

U.S. Appl. No. 12/258,259; Office Action mailed Sep. 20, 2010.

(Continued)

Primary Examiner — Amy He
(74) Attorney, Agent, or Firm — Orrick, Herrington & Sutcliffe LLP (57) ABSTRACT

An apparatus and method for remote detection and monitoring of concealed objects are disclosed. According to one embodiment, an apparatus includes one or more transmitting antennae, one or more receiving antennae with a plurality of receiving channels, a pulse sequence generator providing a sequence of pulse signals to the one or more transmitting antennae, and a signal processing unit receiving a sequence of return signals from an object reflecting the sequence of pulse signals. The signal processing unit includes a variable delay generator that receives signal profile of the sequence of pulse signals from the pulse sequence generator, an amplifier that amplifies the sequence of return signals, a multi-channel integrator that integrates the plurality of receiving channels and produces integrated multi-channel signals, and an analog multiplexer that multiplexes the integrated multi-channel signals.

20 Claims, 10 Drawing Sheets

U.S. PATENT DOCUMENTS

| | | |
|---|---|---|
| 6,308,109 B1 | 10/2001 | Yuyama et al. |
| 6,359,582 B1 | 3/2002 | MacAleese et al. |
| 6,505,093 B1 | 1/2003 | Thatcher |
| 6,573,732 B1 | 6/2003 | Reimer |
| 6,856,271 B1 | 2/2005 | Hausner |
| 7,028,861 B2 | 4/2006 | Sayers et al. |
| 7,046,015 B2 | 5/2006 | Suginouchi et al. |
| 7,049,963 B2 | 5/2006 | Waterhouse |
| 7,098,645 B1 | 8/2006 | Zhu et al. |
| 7,725,150 B2 * | 5/2010 | Tupin et al. .................. 600/407 |
| 2004/0053641 A1 | 3/2004 | Leung et al. |
| 2004/0069849 A1 | 4/2004 | Stevens et al. |
| 2004/0100379 A1 | 5/2004 | Boman |
| 2004/0113783 A1 | 6/2004 | Yagesh |
| 2004/0149822 A1 | 8/2004 | Stevens et al. |
| 2004/0201454 A1 | 10/2004 | Waterhouse |
| 2004/0205350 A1 | 10/2004 | Waterhouse et al. |
| 2005/0007124 A1 | 1/2005 | Tsuji |
| 2005/0029149 A1 | 2/2005 | Leung |
| 2005/0029345 A1 | 2/2005 | Waterhouse et al. |
| 2005/0043850 A1 | 2/2005 | Stevens et al. |
| 2005/0083213 A1 | 4/2005 | Stevens et al. |
| 2005/0086983 A1 | 4/2005 | Stevens et al. |
| 2005/0113703 A1 | 5/2005 | Farringdon et al. |
| 2005/0149226 A1 | 7/2005 | Stevens et al. |
| 2005/0156780 A1 | 7/2005 | Bonthron et al. |
| 2005/0205817 A1 | 9/2005 | Marcichow et al. |
| 2005/0251330 A1 | 11/2005 | Waterhouse et al. |
| 2005/0264438 A1 | 12/2005 | Fullerton et al. |
| 2006/0124662 A1 | 6/2006 | Reynolds et al. |
| 2006/0128023 A1 | 6/2006 | Waterhouse et al. |
| 2006/0164232 A1 | 7/2006 | Waterhouse |
| 2006/0170584 A1 | 8/2006 | Romero et al. |
| 2006/0181413 A1 | 8/2006 | Mostov |
| 2006/0220857 A1 | 10/2006 | August et al. |
| 2006/0232417 A1 | 10/2006 | August et al. |
| 2006/0258896 A1 | 11/2006 | Haber et al. |
| 2007/0171119 A1 | 7/2007 | Dwelly et al. |
| 2007/0194976 A1 | 8/2007 | Reed et al. |
| 2007/0194982 A1 | 8/2007 | Stove |
| 2007/0205937 A1 | 9/2007 | Thompson et al. |
| 2008/0129581 A1 * | 6/2008 | Douglass et al. .............. 342/52 |

OTHER PUBLICATIONS

U.S. Appl. No. 12/258,259; Notice of Allowance mailed Feb. 3, 2011.
U.S. Appl. No. 11/343,560; Office Action mailed Jan. 18, 2008.
U.S. Appl. No. 11/343,560; Office Action mailed Sep. 11, 2008.
U.S. Appl. No. 11/343,560; Notice of Allowance mailed Feb. 2, 2009.
PCT/US2008/084240—PCT Search Report and Written Opinion, Feb. 4, 2009, Kirsen Technologies Corporation.
EP Supplementary European Search Report, EP 08 85 1762, Mar. 10, 2011.
Toomay, John C., et al.: "Radar Principles for the non-specialist (passage)", *Radar Principles for the Non-Specialist*, Scitech Publishing, pp. 137-138 (Jan. 1, 2004).
EP European Examination Report, EP 08 85 1762.8, Nov. 10, 2011.

\* cited by examiner

APPARATUS FOR REMOTE DETECTION AND MONITORING OF CONCEALED OBJECTS

The present application claims the benefit of and priority to U.S. Provisional Patent Application No. 60/989,399 filed on Nov. 20, 2007, and is hereby incorporated by reference.

FIELD

The field of the invention relates generally to registration and monitoring of concealed objects and specifically to remote detection of concealed objects.

BACKGROUND

Remote detection of concealed objects is an important task that arises in various activities. Remote detection of weapons and explosives is useful for combating terrorism by remotely detecting a suspect's hostile intent and safely isolating the armed suspect. Detection of humans or animals through obstacles is necessary for various rescue operations.

Remote monitoring of victim's psycho-physiological states may be an additional task during rescue operations. In many cases, remote monitoring allows timely aid for a patient when direct observation is impossible.

Prior art devices for remote surveillance, detection, and diagnostics utilize cameras operating in the visible or infrared spectrum. Such cameras are widely used for surveillance coverage of open spaces, buildings, and vehicles. However, such cameras deliver limited or no information when the target is concealed or obstructed by a barrier.

At security checkpoints, portal devices are often used to detect weapons and other dangerous items within the portal's inner zone. Portal devices have large dimensions and weight, thus are inappropriate for mobile use because they require the examined object to be positioned within the inner zone of the portal.

Prior art devices detect concealed objects using radar transponders that are configured to direct radar signals at a suspect and to detect a portion of the radar signals reflected by the suspect. A processor connected to the transponders processes the radar signals to determine whether the suspect carries a concealed object. When a concealed object is detected, a real-time alert such as an audible alert is produced.

Another type of object detection system detects a person entering a secured zone by illuminating the person with low-power polarized radio waves. Polarized waves in different direction are reflected back from the person. The return signals are collected and analyzed to determine that the person is hiding a weapon by calculating the difference of the reflected polarized signals in the time domain.

SUMMARY

An apparatus and method for remote detection and monitoring of concealed objects is disclosed. According to one embodiment, an apparatus comprises one or more transmitting antennae, one or more receiving antennae with a plurality of receiving channels, a pulse sequence generator providing a sequence of pulse signals to the one or more transmitting antennae, and a signal processing unit receiving a sequence of return signals from an object reflecting the sequence of pulse signals. The signal processing unit comprises a variable delay generator that receives signal profile of the sequence of pulse signals from the pulse sequence generator, an amplifier that amplifies the sequence of return signals, a multi-channel integrator that integrates the plurality of receiving channels and produces integrated multi-channel signals, and an analog multiplexer that multiplexes the integrated multi-channel signals.

The above and other preferred features, including various novel details of implementation and combination of elements will now be more particularly described with reference to the accompanying drawings and pointed out in the claims. It will be understood that the particular methods and apparatus are shown by way of illustration only and not as limitations. As will be understood by those skilled in the art, the principles and features explained herein may be employed in various and numerous embodiments.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings described herein and do not limit the scope of the claims.

DETAILED DESCRIPTION

A system and method for space control and remote monitoring is disclosed. According to one embodiment, an apparatus comprises one or more transmitting antennae, one or more receiving antennae with a plurality of receiving channels, a pulse sequence generator providing a sequence of pulse signals to the one or more transmitting antennae, and a signal processing unit receiving a sequence of return signals from an object reflecting the sequence of pulse signals. The signal processing unit comprises a variable delay generator that receives signal profile of the sequence of pulse signals from the pulse sequence generator, an amplifier that amplifies the sequence of return signals, a multi-channel integrator that integrates the plurality of receiving channels and produces integrated multi-channel signals, and an analog multiplexer that multiplexes the integrated multi-channel signals.

The present system and method detects and identifies suspicious objects concealed under clothes or in luggage. The device also presents a high-resolution radio image of targets of interest for manual analysis. The present system and method measures biometric parameters and psycho-physiological information of a target subject by remote detection of a hostile intent.

In the following description, for the purposes of explanation, specific nomenclature is set forth to facilitate an understanding of the various inventive concepts disclosed herein. However, it will be apparent to one skilled in the art that these specific details are not required in order to practice the various inventive concepts disclosed herein.

The present system and method also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

According to one embodiment, the present remote detection and monitoring apparatus (RDMA) detects an individual and his/her psycho-physiological states. Persons wielding weapons or carrying explosives behind a barrier or wall may be detected. In one embodiment, the RDMA includes two antennas, a signal generation unit, a signal processing unit, a device control unit, a display unit, and a power supply unit. One antenna may transmit a signal and the other antenna may receive a reflected signal.

In another embodiment, the RDMA has one transmitting antenna and two receiving antennas separated at a distance from each other to determine a target's azimuthal position by a triangulation method.

In yet another embodiment, the RDMA has one transmitting antenna with vertical polarization, one transmitting antenna with horizontal polarization, and two receiving antennas with vertical polarization to determine the polarization of a target by analyzing the reflected signals.

According to one embodiment, the distance to a target is calculated based on the comparison of parameters of the transmitted and the return signals (i.e., object return signal) with regard to the travel time. Moving objects may be detected by recording the change of the return signal using inter-period subtraction. Moving and motionless objects may be distinguished based on the change of the object's azimuthal position.

According to one embodiment, weapons underneath clothes or behind a wall are detected through analyzing a polarization coefficient of the reflected signal. Firearms can be distinguished from explosive belts by examining the polarization factor of the return signal. The procedure for examining polarization factor is described below in further details.

According to one embodiment, weapons concealed under clothes or behind a wall are detected using target portrait analysis. Resonant frequencies in the return signal are isolated and matched with a sample image library.

According to one embodiment, explosives or objects made of dangerous substance are detected by finding matching absorption frequencies with a sample image library. The results of the analysis may further distinguish weapons from explosives. One or more methods described above and hereinafter may be combined to improve the accuracy of object detection and identification.

According to one embodiment, various physiological states of a target individual such as left ventricular ejection time (LVET), respiration rate, and heart rhythm, are detected by monitoring and analyzing the fluctuating amplitudes of the return signal.

According to one embodiment, perspiration of a target individual is determined by analyzing the intensity of the return signal from the target individual's skin surface. Arterial blood pressure of the target individual may be determined by analyzing the difference of amplitudes of systole and diastole. Muscle tone of the target individual may be calculated by analyzing fluctuating amplitudes of the return signal.

According to one embodiment, the psychological state of a target individual may be determined by monitoring and analyzing one or more of the target individual's LVET, perspiration, heart rhythm, blood pressure, vasomotor fluctuations data, muscle tone, and rush of blood to the organs.

The RDMA analyzes a change of the effective radar cross section, detects breath rate, and builds a pulsogram: The pulsogram gives information about the heart rate, blood pressure, and sweat.

According to one embodiment, the RDMA measures psycho-physiological states of a target individual to determine the target individual's hostile intent. The ability to measure psycho-physiological states may be used for a patient as a remote cardiac monitor for measuring the patient's various physiological parameters such as heart rate, breath rate, vasomotorial functions, muscle tone, and sweating. The mobility of the system facilitates the usage under field conditions or in transport.

According to one embodiment, the RDMA uses ultra wideband (UWB) radar for probing targets. The apparatus may be hand-held and does not require fixed installation. The RDMA may operate on a battery for several hours between battery recharging or replacement.

Figure 1:
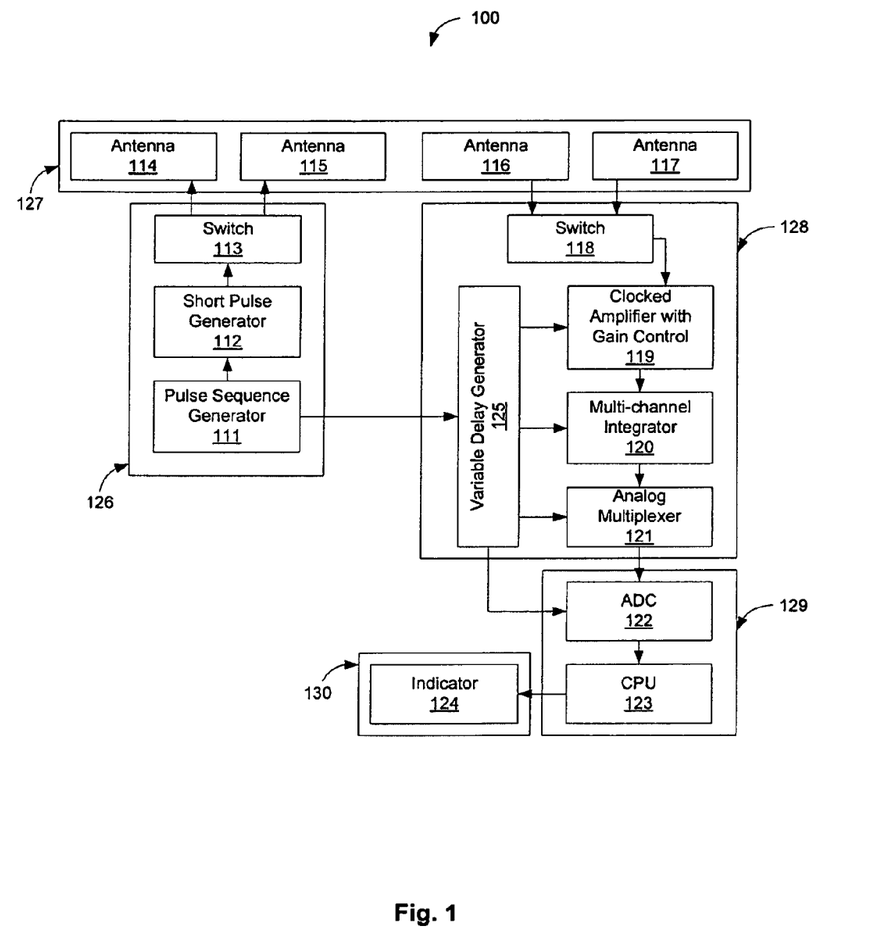
FIG. 1 illustrates a block diagram of an exemplary remote detection and monitoring apparatus (RDMA), according to one embodiment.

FIG. 1 illustrates a block diagram of an exemplary remote detection and monitoring apparatus (RDMA), according to one embodiment. RDMA 100 has signal generation unit 126, antenna unit 127, signal processing unit 128, device control unit 129, display unit 130, and power supply unit (not shown). Signal generation unit 126 includes pulse sequence generator 111, short pulse generator 112, and switch 113. Antenna unit 127 includes vertically polarized transmitting antenna 114, horizontally polarized transmitting antenna 115, vertically polarized receiving antennae 116 and 117. Signal processing unit 128 includes switch 118, clocked amplifier with gain control 119, multi-channel integrator 120, analog multiplexer 121, and variable delay generator 125. Device control unit 129 includes analog-to-digital converter (ADC) 122 and central processor (CPU) 123. Display unit 130 includes display 124, or other similar data display unit.

Pulse sequence generator 111 activates short pulse generator 112 and sends the generated signal data to variable delay generator 125 of signal processing unit 128 for later signal processing. Switch 113 switches the transmission channels between transmitting antennae 114 and 115. In one embodiment, antennae 114 and 115 transmit a train of short pulses with a specific time delay generating an ultra wideband (UWB) signal. The transmitted signal is reflected by an object, and the return signal is received by receiving antennae 116 and 117. The return signal is fed to clocked amplifier 119 having a gain control via switch 118. The return signal is further processed by multi-channel integrator 120 and analog multiplexer 121.

Clocked amplifier 119 amplifies the received signal from switch 118. The amplifier input channel is activated only at a moment in time, allowing to receive return signals reflected from an object located at a certain distance range away from RDMA 100. The input channel opening signal is received from variable delay generator 125. Multi-channel integrator 120 sums the signals received by each antenna over a specified time interval to achieve a better signal-to-noise ratio. The signals received by different receiving antennas are separated using the information from variable delay generator 125. Analog multiplexer 121 provides the multi-channel data to ADC 122.

Clocked amplifier 119, multi-channel integrator 120, and analog multiplexer 121 receive the signal profile of the transmitted signal from variable delay generator 125. Using ADC 122, the return signal is converted to a digital signal, and the converted signal is delivered to CPU 123 of device control unit 129, where the return signal is processed. The processed data is directed to display unit 124 of display unit 130 for displaying.

According to one embodiment, antenna unit 127 may have only one antenna for both transmitting and receiving signals, or antenna unit 127 may have one transmitting antenna 115 and one receiving antenna 116. With two receiving antennae 116 and 117, the azimuth of a target may be determined by a triangulation method. With vertically polarized transmitting antenna 114, horizontally polarized transmitting antenna 115, and two vertically polarized receiving antennae 116 and 117, richer information about the surface property and the condition of a target may be obtained to identify the target more accurately.

Figure 2:
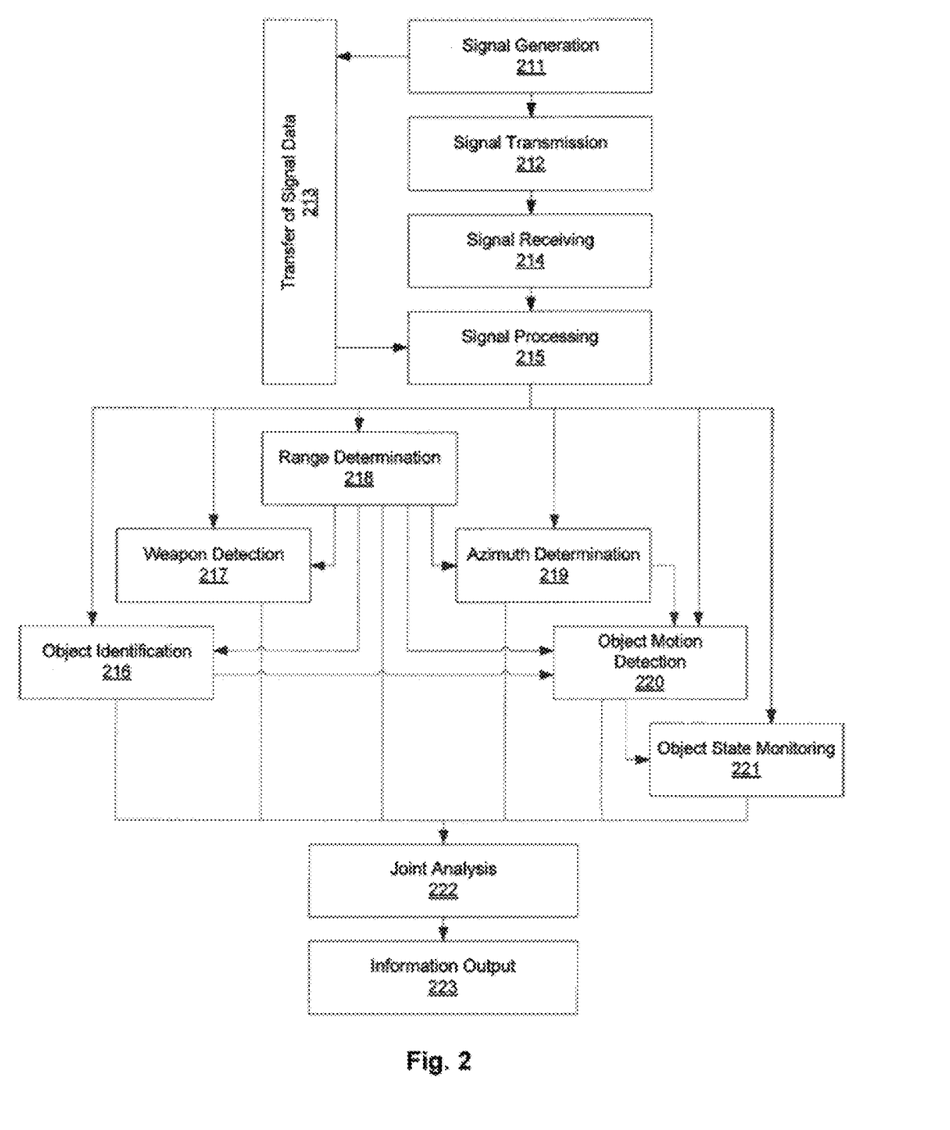
FIG. 2 illustrates an operational flow diagram of an exemplary RDMA, according to one embodiment.

FIG. 2 illustrates an operational flow diagram of an exemplary RDMA, according to one embodiment. When RDMA 100 is powered on, probing signal is generated (211) and transmitted (212) using one or more transmitting antennae (e.g., 114 and 115). The return signal is received (214) by one or more receiving antennae (e.g., 116 and 117). Signal processing unit 128 receives and processes the transmitted signal data from signal generation unit 126 (213) as well as the return signal reflected from an object (or target). Signal processing unit 128 identifies the object (216) and detects whether the object is or contains a weapon and an explosive (217). Signal processing unit 128 also determines the distance to the object (218) and its azimuth 219. According to one embodiment, signal processing unit 128 monitors the return signal from an object over a period to determine whether the object is moving or motionless. According to another embodiment, signal processing unit 128 determines the psycho-physiological attributes of a live object (221). Signal processing 215 may be performed by each individual process 216-221 or joint analysis may be performed (222) by congregating analysis results from each process 216-221. The processed data and information is displayed (223) using display 124 of display unit 130.

Figure 3:
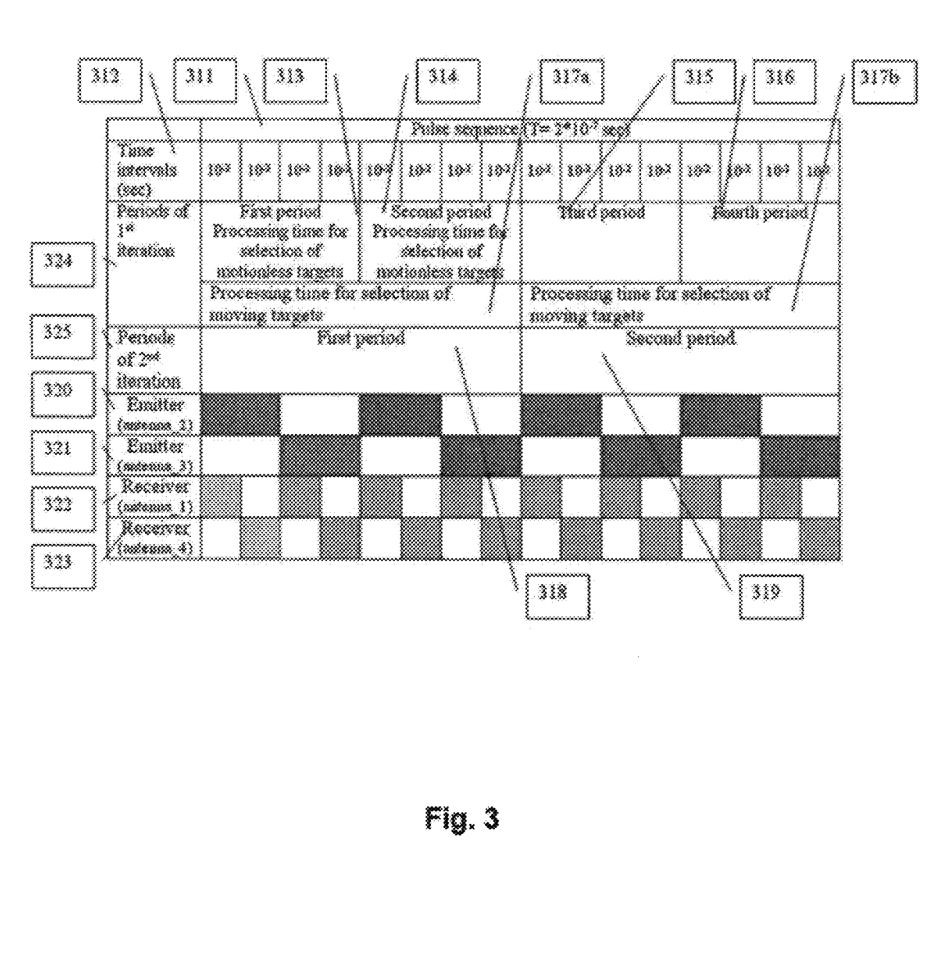
FIG. 3 illustrates an exemplary timing diagram of an RDMA, according to one embodiment.

FIG. 3 illustrates an exemplary timing diagram of an RDMA, according to one embodiment. Signal generation unit 126 generates a sequence of pulses 311 with a period $\rho_{op}=2.10^{-7}$ sec. Time intervals 312 show the time resolution of events occurring during a pulse sequence 311. Time intervals 312 of transmitting and receiving antennae are highlighted; emitters 320 and 321 correspond to transmitting antennae 114 and 115, and receivers 322 and 323 correspond to receiving antennae 116 and 117.

For each reflected pulse from a target, a response function $G_{i,j}^{o}(t)$ is formed that measures the magnitude of the reflected pulse. In order to improve signal/noise ratio, each receiver 322 and 323 accumulates the magnitude of the reflected signal during a first processing interval ($\tau=10^{-2}$ sec) and determines a mean value.

A series of response functions, $^{k}G_{i,j}(t)$ (where k denotes a sequence number) is transformed to radar situation vector, $G_{i,j}$ and distance vector, $H_{i,j}$. For the purpose of illustration, vector designation herein denotes subscripts i for a transmitting antenna (e.g., 2=emitter 320, 3=emitter 321) and j for a receiving antenna (e.g., 1=receiver 322, 4=receiver 323).

According to one embodiment, an iterative method of inter-period subtraction is used in order to select a moving or jittering target. At the first iteration 324, a fast moving target (e.g., velocity ~5 km/h) is selected by subtracting functions of the first period 313 and second period 314 by:

$$^{1}G_{2,1}*(t) = |^{1}G_{2,1}(t) - ^{2}G_{2,1}(t)|,$$

where asterisk * denotes inter-period subtraction. In a similar fashion, functions $^{1}G_{2,4}*(t)$, $^{1}G_{3,1}*(t)$, $^{1}G_{3,4}*(t)$ are derived for the coordinate measurements and polarization selection. Further changes are determined by subtraction of functions of the second 314, third periods 315 and so on.

Second iteration 325 is examined for selecting a slow-moving target by:

$$^{2}G_{2,1}*(t) = \|^{1}G_{2,1}(t) + ^{2}G_{2,1}(t)| - |^{3}G_{2,1}(t) + ^{4}G_{2,1}(t)\|$$

Result vectors of initial processing are formed for each cycle of measurement. There are 4 vectors of magnitude of reflected signals $G_{i,j}$ and 4 vectors of distance $H_{i,j}$ as shown below:

$$G_{2,1} = \begin{vmatrix} g_1^{2,1} \\ g_2^{2,1} \\ g_3^{2,1} \\ g_n^{2,1} \end{vmatrix} \ldots H_{21} = \begin{vmatrix} h_1^{2,1} \\ h_2^{2,1} \\ h_3^{2,1} \\ h_n^{2,1} \end{vmatrix}$$

$$G_{2,4} = \begin{vmatrix} g_1^{2,4} \\ g_2^{2,4} \\ g_3^{2,4} \\ g_n^{2,4} \end{vmatrix} \ldots H_{2,4} = \begin{vmatrix} h_1^{2,4} \\ h_2^{2,4} \\ h_3^{2,4} \\ h_n^{2,4} \end{vmatrix}$$

$$G_{3,1} = \begin{vmatrix} g_1^{3,1} \\ g_2^{3,1} \\ g_3^{3,1} \\ g_n^{3,1} \end{vmatrix} \ldots H_{3,1} = \begin{vmatrix} h_1^{3,1} \\ h_2^{3,1} \\ h_3^{3,1} \\ h_n^{3,1} \end{vmatrix}$$

$$G_{3,4} = \begin{vmatrix} g_1^{3,4} \\ g_2^{3,4} \\ g_3^{3,4} \\ g_n^{3,4} \end{vmatrix} \ldots H_{3,4} = \begin{vmatrix} h_1^{3,4} \\ h_2^{3,4} \\ h_3^{3,4} \\ h_n^{3,4} \end{vmatrix}$$

For each reflected pulse from a target, values of the function h are determined based on the signal travel time to target and back, $$h = \frac{t \cdot c}{2},$$

wherein c is the speed of light.

Further processing uses the obtained vector set for determining the targets coordinate, effective radar cross section (ERCS) fluctuations, and polarization patterns. Range to the target R is calculated using the signal transit time to and back from a target:

$$t_R = \frac{2R}{c},$$

wherein c is the speed of light.

According to one embodiment, a coincidence method is used for range finding utilizing variable delay generator 125 and clocked amplifier 119. The coincidence method is a method of comparison against a measure, wherein the difference between the measured value and the value reproduced by the measure is determined by the degree of signal match. In this sense, the coincidence method is a stroboscopic method because the time of signal reception by clocked amplifier 119 is set using variable delay generator 125. Coincidence or comparison of the initial time of return signal reception with the input channel opening signal makes it possible to calculate the distance to the target.

According to one embodiment, RDMA 100 has two receiving antennae that are separated by a certain distance to determine the azimuthal position of a target. A triangular method calculates the target's azimuthal position using the ranges to the target measured by each of the two receiving antennae.

Figure 4:
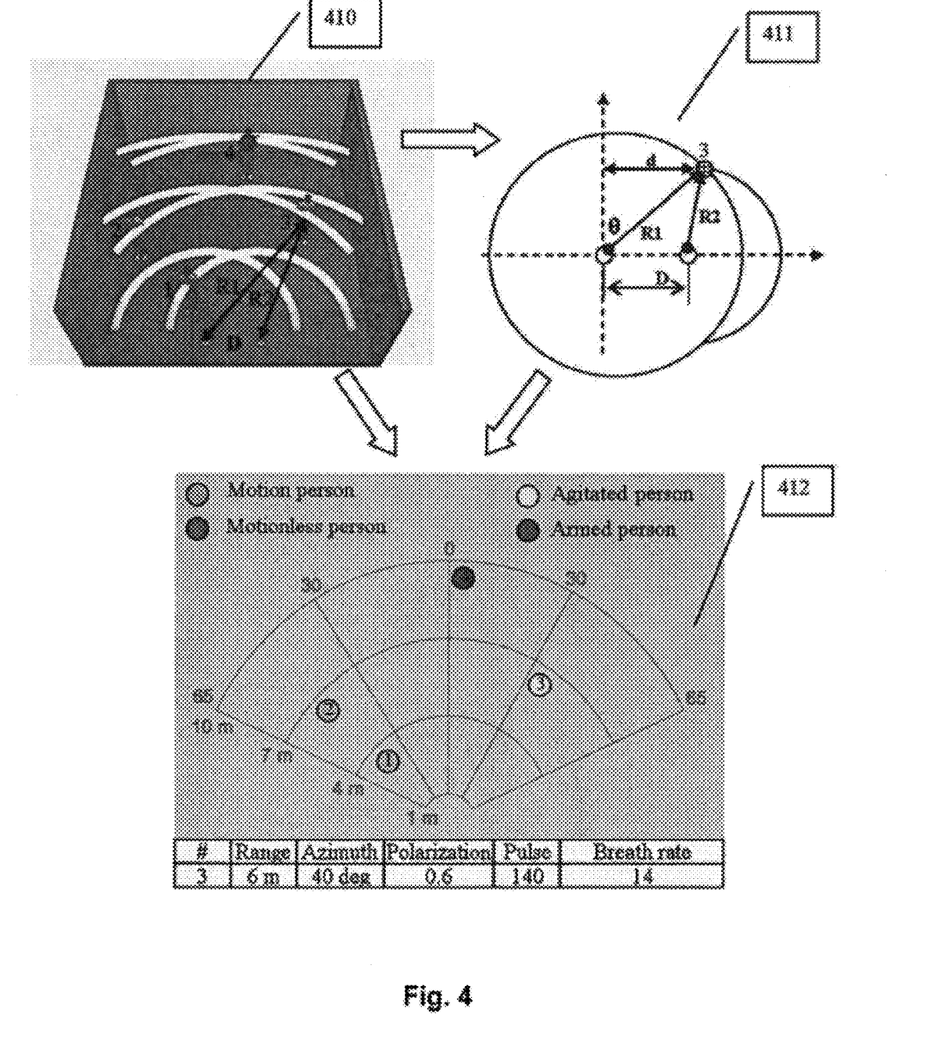
FIG. 4 illustrates an exemplary triangular method for calculating azimuthal position of a target, according to one embodiment.

FIG. 4 illustrates an exemplary triangular method for calculating azimuthal position of a target, according to one embodiment. D is the distance between antenna 116 and antenna 117. R1 and R2 are the distances from antenna 116 and antenna 117 to the target. Azimuth to the target is determined as: θ=90−arc cos(α), wherein $$\cos(\alpha) = \frac{R_1^2 + D^2 - R_2^2}{2R_1 D}.$$

An exemplary display 412 shows targets detected by RDMA 100 and shows the distance and azimuth of each detected target.

According to one embodiment, moving and motionless objects may be distinguished by monitoring the change the target's range and azimuth instead of the inter-period subtraction method described above.

Figure 5:
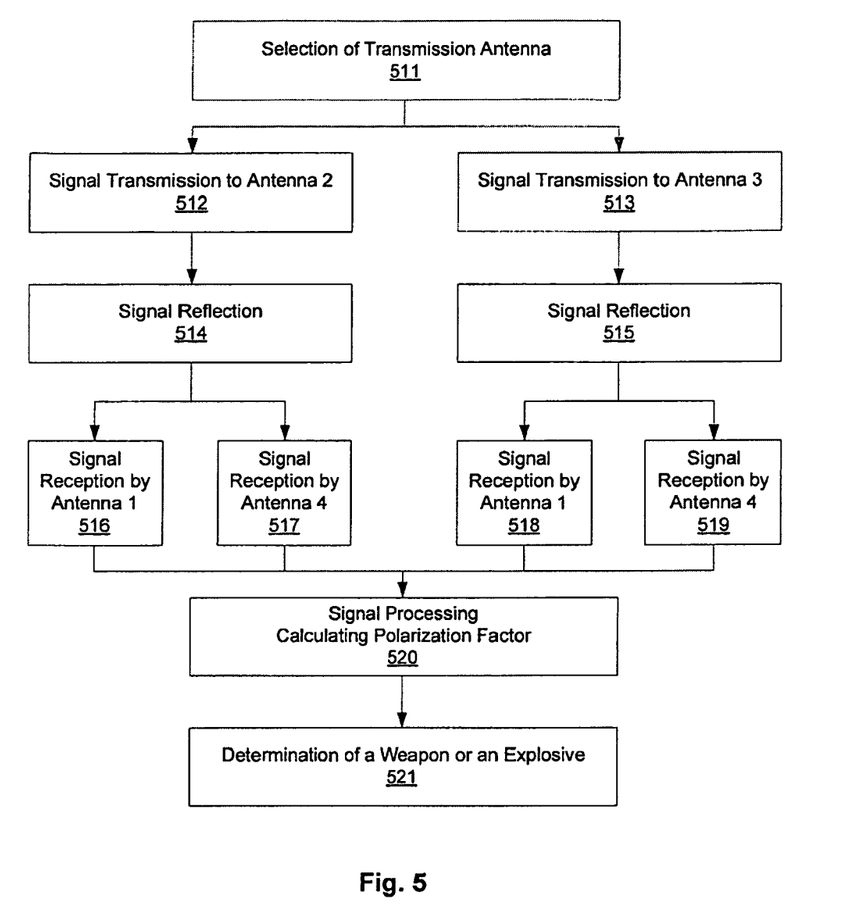
FIG. 5 illustrates an exemplary block diagram for determining the detection of a weapon, according to one embodiment.

FIG. 5 illustrates an exemplary block diagram for determining the detection of a weapon, according to one embodiment. Transmitting antenna is selected (511). Antenna 2 transmits a vertically polarized signal (512), and alternately, antenna 3 transmits a horizontally polarized signal (513). The return signals 514 and 515 from a target are received by antenna 1 (516 and 518) and antenna 4 (517 and 519). The return signals by antennae 1 and 4 are processed (520), and the polarization factor of the target is determined. Using the calculated polarization factor, an analysis is performed to determine whether the detected target is a suspicious object (e.g., a weapon, an explosive belt or a shrapnel) (521).

According to one embodiment, the return signals from a target may be used to reconstruct an image of the target with a diffusive background and bright dots. The diffusive background is caused by the roughness of the target surface with a dimension that is less than the wave length of the probing signal. Polarization of the background may be random and weakly dependent on the polarization of the probing signal, thus the contribution from the diffusive background is relatively small compared to the reflected (diffused) signal from the target.

Bright dots constructed by the reflection from the target significantly contribute to the diffused signal. Bright dots are caused by the target having small mirror surfaces focused normally to a line of sight. If the size of these mirror surfaces is half of the wave length of the probing signal (half wave dipole), the contribution to the diffused signal is maximal. The plane of polarization of the diffused signal depends on the orientation of the dipole. If the reflected signal is polarized vertically or horizontally, and the dipole is focused under 45°, the diffused signal contains both vertical and horizontal polarization.

The cross-polarization may be evaluated by the polarization coefficient:

$$B = (G_{2,1}{}^* - G_{2,1}{}^* + G_{3,1}{}^*),$$

If the target is a half-wave dipole rotated by 45° from the horizon, the polarization coefficient B is zero. Since the actual target has randomly oriented dipoles, the polarization factor is between 0 and 1. The greater the polarization factor, the greater the probability that the object is a weapon.

Small pieces of firearms made of steel may exhibit depolarization at certain perspectives. As the weapon has fewer small pieces than an explosive belt, the polarization coefficient of an explosive belt (due to the difference in "small pieces") and the weapon significantly differs so that $B_{weapon} > B_{explosive\_belt}$. Since RDMA 100 detects moving and motionless targets, detection of weapons and explosive belts may be performed selectively for each target. Once a moving target is determined to have a coefficient of depolarization of a weapon or an explosive belt, the armed target is isolated and displayed on display 124.

Figure 6:
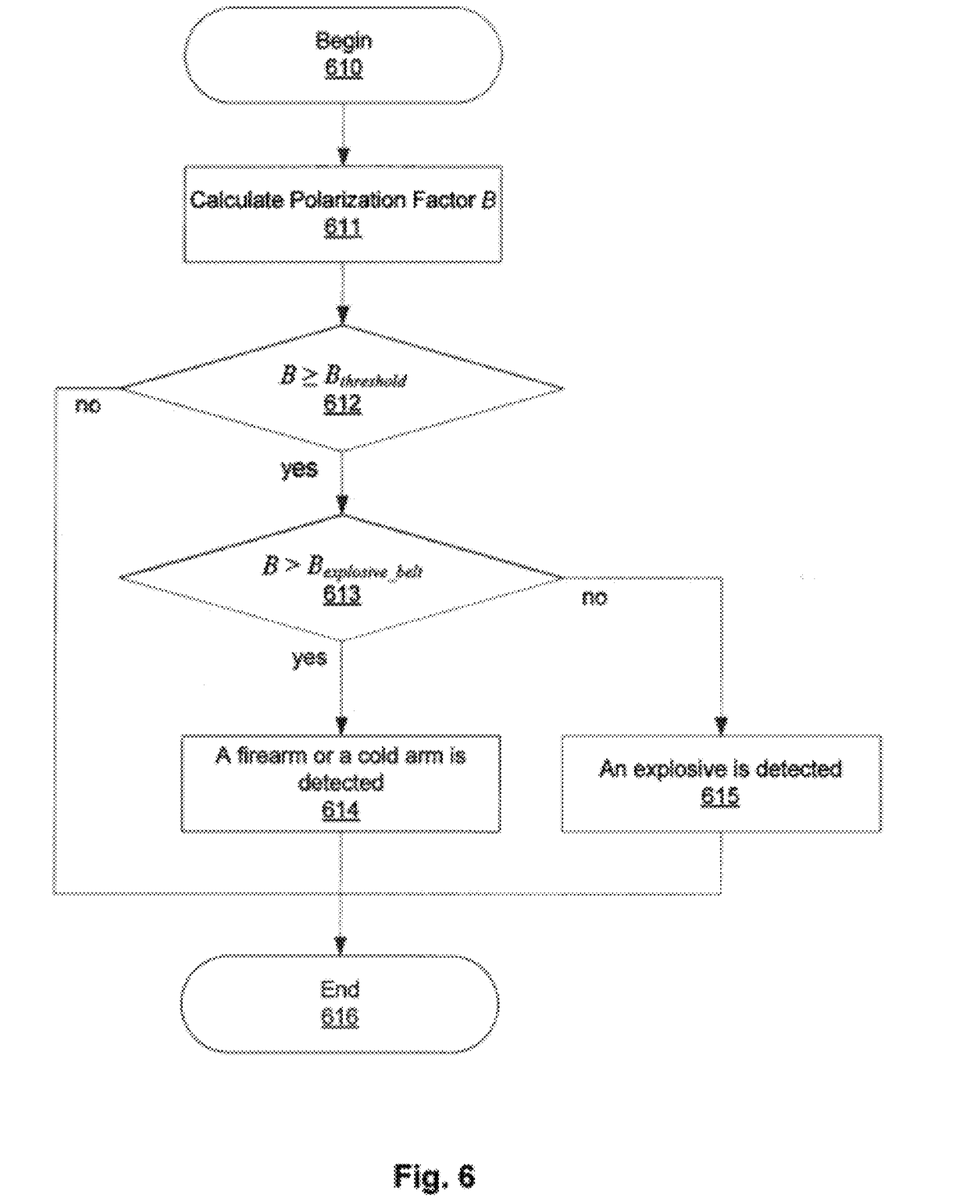
FIG. 6 illustrates a flow chart of an exemplary weapon detection process, according to one embodiment.

FIG. 6 illustrates a flow chart of an exemplary weapon detection process, according to one embodiment. The polarization factor of a return signal is calculated (611). The polarization factor B is checked (612) against threshold B threshold. In one embodiment, $B_{threshold}$ may be determined experimentally. If $B \geq B_{threshold}$, the polarization factor B of the signal being analyzed is checked against a predetermined value $B_{explosive\_belt}$ (613). If $B > B_{explosive\_belt} > B_{threshold}$, a decision is made that the target carries a firearm or cold arm (614). If $B_{explosive\_belt} > B > B_{threshold}$, a decision is made that the target carries an explosive belt (615).

According to one embodiment, RDMA 100 detects a target using one or more of the detection methods including the construction of the target portrait, the determination of resonant frequencies, and the determination of absorption frequencies.

Figure 7:
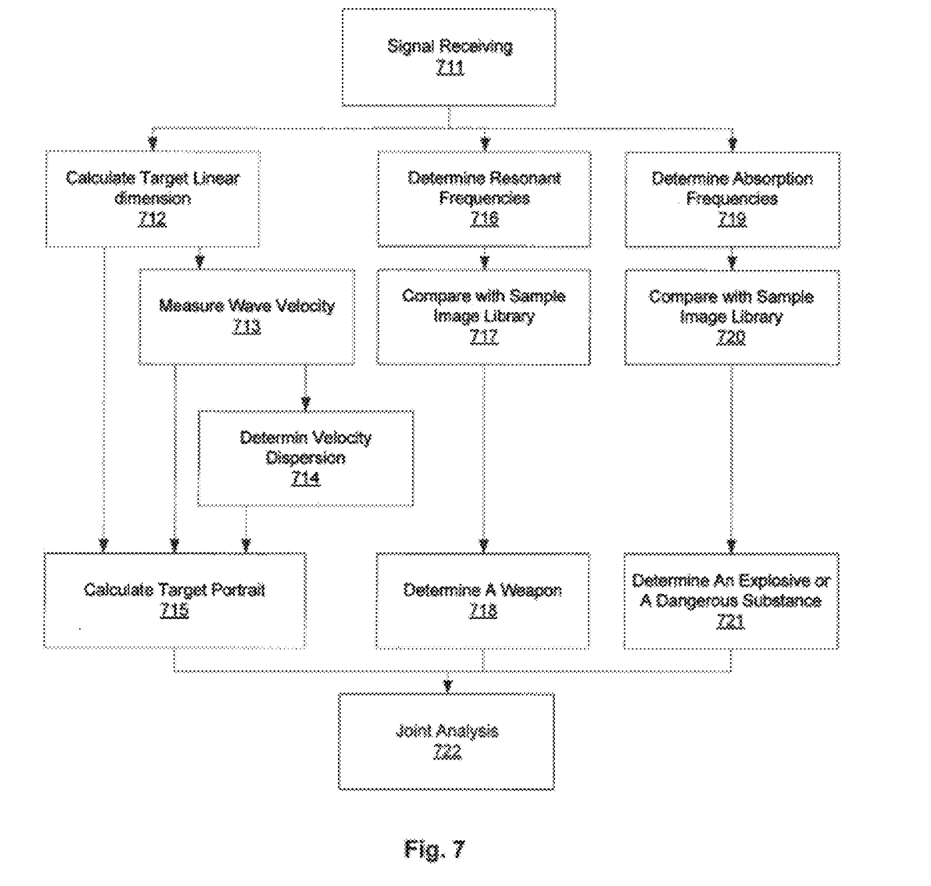
FIG. 7 illustrates an exemplary flow diagram of an RDMA for object identification, according to one embodiment.

FIG. 7 illustrates an exemplary flow diagram of an RDMA for object identification, according to one embodiment. In one embodiment, RDMA 100 employs the UWB radar technology and observes a target by reconstructing reflected signals in a two-dimensional or three-dimensional space represented by bright dots. Since UWB radar has high spatial resolution, the reflected signal contains a pulse sequence, $U=u(t_1), u(t_2), \ldots, u(t_n)$. Target linear dimension 712 may be calculated by $L=c \cdot (t_n-t_1)$, wherein $t_1$ and $t_n$ are the time of reception of the first and the last pulse.

Different materials have different wave propagation velocity. Using the calculated target linear dimension, the velocity of the reflected signal from a target is measured (713), and the target containing high wave velocity materials (e.g., metal) is discerned. In addition, moving targets may have varying azimuths and ranges. In that case, bright dots scintillate and fluctuate on display 124. The velocity dispersion is measured to determine that the target is or carries a weapon (714). Joint analysis of the target linear dimension (712), wave velocity (713), and velocity dispersion (714) may be performed to construct the target portrait on display 124 (715).

Weapon parts typically have high echoing capacity and exhibits a resonating frequency when exposed to an UWB signal. Using a stroboscopic oscillometry method, RDMA 100 isolates the resonant frequency (716). The isolated resonant frequency is compared against the sample image library (717), and the carriage of a weapon by the target is determined (718).

Joint analysis of data using the target portrait 715, the determination of a weapon 718 based on resonant frequencies, and determination of an explosive 722 based on absorption frequencies enables the identification of the target and its characteristics more accurately.

Figure 8:
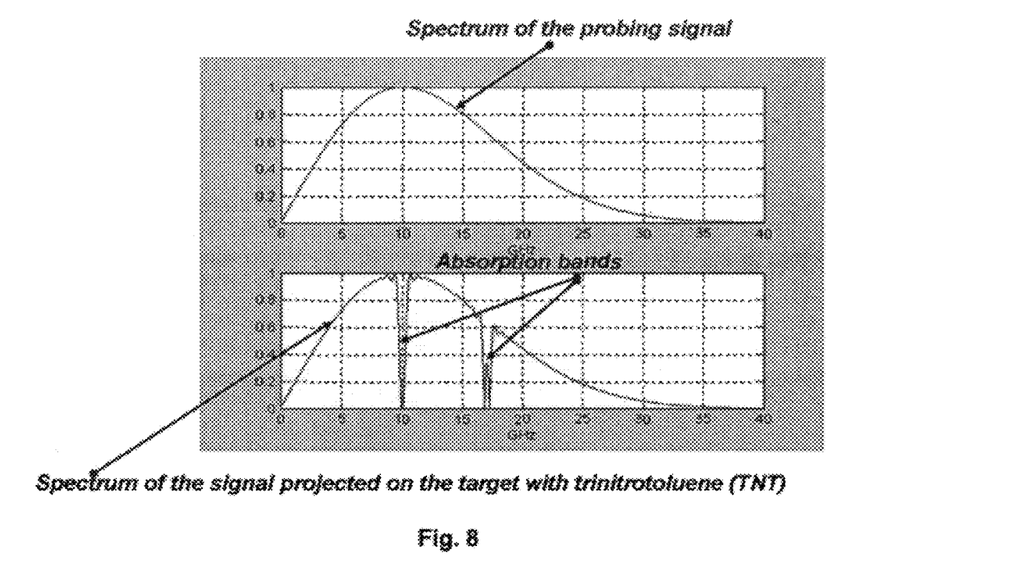
FIG. 8 illustrates an exemplary signal spectrum with absorption frequencies, according to one embodiment.

Explosives and other dangerous substances exposed to microwave signals may absorb the radiation in certain frequency bands. FIG. 8 illustrates an exemplary signal spectrum with absorption frequencies, according to one embodiment. The RDMA 100 determines absorption frequencies. A radio signal is reflected by the observed object not only by its front surface (with respect to the device), but also by its rear surface. When a frequency-modulated signal is passing through the object to its rear surface, its amplitude changes. Depending on the substance's chemical composition, strong absorption of the signal may be observed at specific frequencies characterized by the chemical composition. The reflected signal exhibits the presence of the absorption frequency band whose amplitude is considerably diminished from the emitted frequency-modulated signal. The isolated absorption frequencies are matched against the experimentally acquired sample image library. The presence of an explosive or other dangerous substance is determined.

Figure 9:
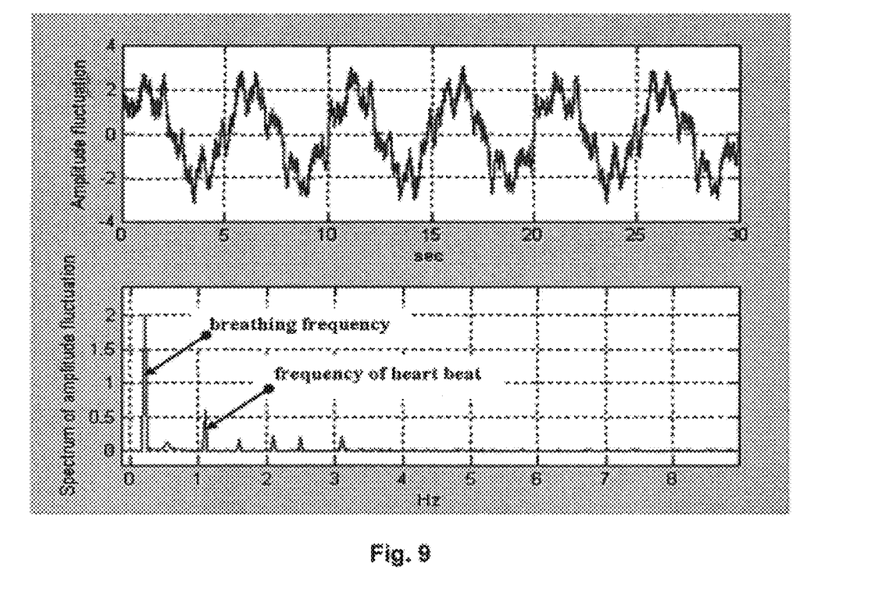
FIG. 9 illustrates an exemplary scanned signal containing heart and respiration rate information, according to one embodiment.

According to one embodiment, RDMA determines psycho-physiological parameters of a scanned subject. Slow fluctuations of the probing signal allow for remote measurement of different rhythms of the scanned subject. The probing signal may be received through an opaque barrier. In one embodiment, the psycho-physiological parameters may be scanned for the entire group of people within the range of measurement, and a person with anomalic psycho-physiological parameter is detected. The scanning process may be carried out over several seconds. Fast Fourier transform (FFT) may be performed on a series of return signals, and s signal spectrum for each target is formed. FIG. 9 illustrates an exemplary scanned signal containing heart and respiration rate information, according to one embodiment.

Figure 10:
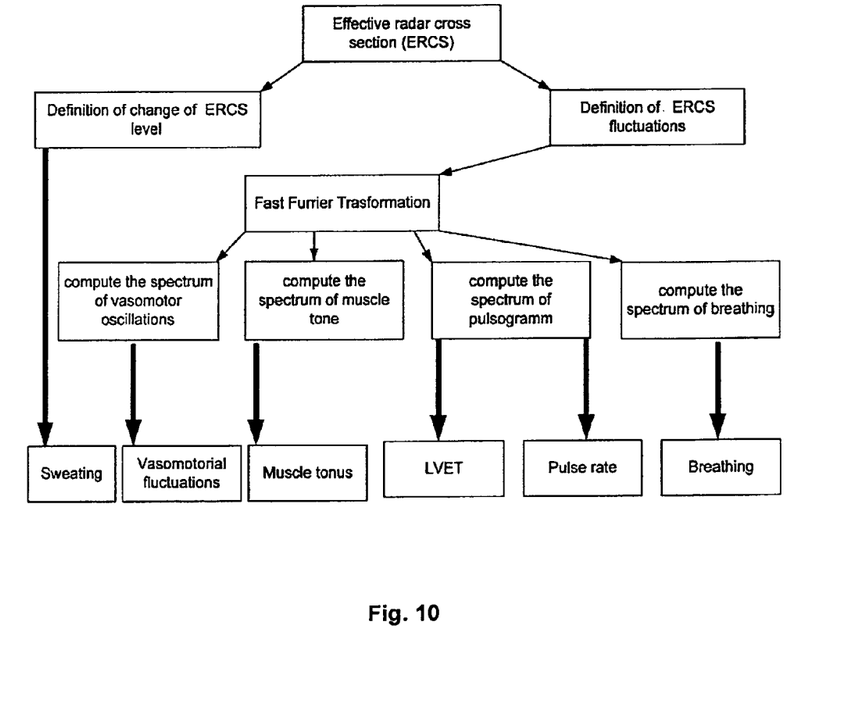
FIG. 10 is a flow diagram of an exemplary data acquisition process for the psychophysiological state of a patient, according to one embodiment.

FIG. 10 illustrates a flow chart of an exemplary process to determine psycho-physiological parameters, according to one embodiment. An analysis of the changes in effective radar cross section (ERCS) reveals the changes in perspiration of the scanned subject. Fluctuations in ERCS also give information about plethysmogram, breathing, vasomotorial functions, and muscle tonus of the scanned subject. Each physiological parameter has its own fluctuation frequency. For example, typical vasomotorial signals range from 0.0017-0.017 Hz, muscle tonus signals from 0.017-0.17 Hz, breathing signals from 0.08-0.5 Hz, and heart beat signals from 0.67-4 Hz.

Figure 11:
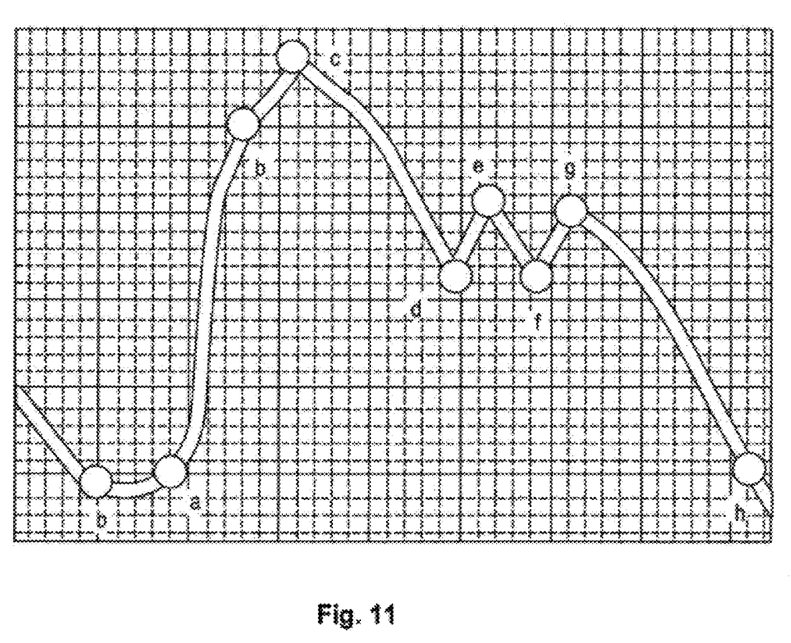
FIG. 11 illustrates an exemplary waveform describing heart-muscle operation, according to one embodiment.

FIG. 11 illustrates an exemplary waveform describing heart-muscle operation, according to one embodiment. From the waveform constructed by RDMA, left ventricular ejection time (LVET) and the heart beat may be determined. LVET is the heart parameter (speed of contraction of the left ventricle) that is known to be correlated with "hostile intent." The left ventricle pumps blood on the large circuit, and the right ventricle pumps blood on the smaller respiratory/lung circuit.

According to one embodiment, RDMA detects a plethysmogram in real-time. A plethysmogram is a derived measurement of heart activity. A plethysmogram may be used to evaluate the heart activity and compute LVET based on an analysis of the fluctuations in the amplitude of the reflected signal and the relative position of the characteristic points on the plethysmogram.

In FIG. 11, a typical heart cycle (plethysmogram) having the following phases of interest is shown; a-b-c is a systole phase with an increased pressure during heart muscle contraction; c-d is the phase of reduction of pressure at the tail end of systole; e is the phase of closing half moon valves; and f-g-h is the phase of reduction of blood pressure during diastole.

Phase a-b-c, the isometric contraction of the ventricle's systole, occurs with closed heart valves. The beginning of this phase coincides with the phase of abrupt increase in the internal to ventricle's pressure. The derivative at point a may be used for the analysis of intensity and speed of ventricle operation. The amplitude of a-b-c correlates to the arterial pressure; one of the main parameters of heart operation. The measured peripheral blood pressure is analyzed as low-pass-filtered arterial pressure.

The operation of the left ventricle is characterized by (a) the heartbeat frequency; (b) the speed, with which the left ventricle muscle tissue is changing its tone, e.g., transitions from the relaxed to the contracted state; and (c) the blood pressure created by the left ventricle for opening the valve (instantaneous power of the pump with respect to one blood ejection from the ventricle).

Since the right ventricle operates at an order of magnitude lower power, the plethysmogram of the peripheral pulse provides a rich source of information on the physiology of the left ventricle. By analyzing physiological parameters, hostile intent of the scanned subject is determined.

According to one embodiment, the psychological condition of a live subject is characterized by the values of physiological parameters as illustrated in FIG. 10. Depending on the psychological condition, for example stress levels, a person may experience sweating, changes in breathing rate and heart rate, changes in muscle tone, etc. These changes are mainly correlated with various hemodynamic changes (e.g., changes in the amount/volume/presence of blood in various human organs, vessels and muscles). Hemodynamic changes may be measured by observing the changes in total ERCS of the observed person or ERCS of each body part separately. The signals pertaining to these psychological parameters are compared with critical and baseline thresholds that are determined experimentally. Relative changes of observable physiological parameters are taken into account and analyzed in light of predetermined templates or rules. In one embodiment, a comparison is made between the observed values with a library of values defining typical various psychological conditions. The differences between the observed values and the values from the library determines the psychological condition of the observed person, and a subsequent conclusion is made about the possible hostile intent of the observed person. Because RDMA 100 measures the physiological condition of a target, RDMA 100 may be used for monitoring patients.

A system and method for remote detection and monitoring of concealed objects have been described. It is understood that the embodiments described herein are for the purpose of elucidation and should not be considered limiting the subject matter of the present patent. Various modifications, uses, substitutions, combinations, improvements, methods of productions without departing from the scope or spirit of the present invention would be evident to a person skilled in the art.

I claim:

1. An apparatus, comprising:
   a transmitting antenna;
   a receiving antenna with a plurality of receiving channels;
   a pulse sequence generator for providing a sequence of pulse signals to the transmitting antenna; and
   a signal processing unit for receiving a sequence of return signals from an object reflecting the sequence of pulse signals, the signal processing unit comprising:
      a variable delay generator for receiving a signal profile of the sequence of pulse signals from the pulse sequence generator;
      an amplifier for amplifying the sequence of return signals;
      a multi-channel integrator for integrating the amplified sequence of return signals and for producing integrated multi-channel signals; and
      an analog multiplexer for multiplexing the integrated multi-channel signals.

2. The apparatus of claim 1 further comprising a device control unit comprising:
   an analog to digital converter (ADC) for converting analog signals from the analog multiplexer of the signal processing unit; and
   a CPU for processing digital signals from the ADC.

3. The apparatus of claim 2, wherein at least one of the signal processing unit and the device control unit identifies the object.

4. The apparatus of claim 2, wherein at least one of the signal processing unit and the device control unit detects whether the object is or carries a weapon.

5. The apparatus of claim 2, wherein at least one of the signal processing unit and the device control unit determines the distance to the object.

6. The apparatus of claim 2, wherein at least one of the signal processing unit and the device control unit determines the azimuth of the object.

7. The apparatus of claim 2, wherein at least one of the signal processing unit and the device control unit determines whether the object is moving or motionless.

8. The apparatus of claim 2, wherein at least one of the signal processing unit and the device control unit monitors states of the object.

9. The apparatus of claim 2, wherein at least one of the signal processing unit and the device control unit determines states of an object which reflects the sequence of pulse signals by jointly analyzing object identification, weapon detection, range determination, azimuth determination, object motion detection, and object state monitoring.

10. The apparatus of claim 1 further comprising a display unit for displaying states of the object.

11. A method, comprising:
    emitting a polarized probing signal from an antenna of a remote detection and monitoring apparatus (RDMA);
    receiving a return signal reflected from a target;
    analyzing the return signal with a plurality of analysis algorithms;
    determining a property of the target;
    identifying the target based on the property;
    isolating a biometric signal from the return signal; and
    analyzing a change in effective radar cross section of the target to identify a psycho-physiological state of the target.

12. The method of claim 11, further comprising:
    identifying an absorption frequency from the return signal;
    comparing the absorption frequency with a sample image library;
    identifying a resonant frequency from the return signal;
    comparing the resonant frequency with a sample image library;
    constructing an image of the target using the return signal; and
    jointly analyzing the absorption frequency, the resonant frequency, and the image of the target to identify characteristics of the target.

13. The method of claim 12, further comprising:
    jointly analyzing a target linear dimension and a velocity dispersion of the tar et to construct the image of the target using the return signal.

14. The method of claim 11, wherein identifying the target based on the property further comprising:
    identifying whether the target is or contains a weapon or a dangerous substance.

15. The method of claim 11, further comprising:
    calculating a polarization factor from the return signal.

16. The method of claim 11, further comprising:
    using an iterative method of inter-period subtraction to determine whether the target is moving or motionless.

17. The method of claim 16, further comprising:
    selecting a fast-moving target at a first iteration by subtracting functions of a first period and a second period.

18. The method of claim 17, further comprising:
    selecting a slow-moving target at a second iteration.

19. The method of claim 11, wherein said analyzing the change in effective radar cross section of the target provides information about at least one of plethysmogram of the target, vasomotorial functions of the target, and muscle tonus of the target.

20. The method of claim 11, further comprising:
    determining left ventricular ejection time of the target.

* * * * *